(12) United States Patent
Hattori

(10) Patent No.: US 8,036,591 B2
(45) Date of Patent: Oct. 11, 2011

(54) BOOKBINDING APPARATUS AND BOOKBINDING SYSTEM

(75) Inventor: Masato Hattori, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 574 days.

(21) Appl. No.: 11/906,660

(22) Filed: Oct. 3, 2007

(65) Prior Publication Data
US 2008/0107501 A1   May 8, 2008

(30) Foreign Application Priority Data
Nov. 6, 2006  (JP) .................................. 2006-300022

(51) Int. Cl.
*G03G 15/00* (2006.01)

(52) U.S. Cl. .............. 399/408; 399/407; 412/8; 412/33; 412/37

(58) Field of Classification Search .................. 399/408, 399/407; 412/8, 33, 37
See application file for complete search history.

(56) References Cited

U.S. PATENT DOCUMENTS

| 6,964,707 | B2 * | 11/2005 | Taniguchi et al. | 118/244 |
| 7,314,075 | B2 * | 1/2008 | Takagi et al. | 156/578 |
| 7,448,837 | B2 * | 11/2008 | Oota | 412/37 |
| 7,527,465 | B2 * | 5/2009 | Toyoizumi et al. | 412/37 |

FOREIGN PATENT DOCUMENTS

JP   2004-209746 A   7/2004

* cited by examiner

*Primary Examiner* — Matthew G Marini
(74) *Attorney, Agent, or Firm* — Holtz, Holtz, Goodman & Chick, PC

(57) ABSTRACT

A bookbinding apparatus which forms a booklet by coating adhesive onto a spine of a sheet bundle, the bookbinding apparatus comprising: an adhesive tank which stores adhesive; a supplying section which supplies solid adhesive to the adhesive tank; a melting section which melts the solid adhesive supplied to the adhesive tank; a coating section which coats the adhesive onto the spine of the sheet bundle; and a controller which controls the supplying section to supply the solid adhesive from the supplying section to the adhesive tank when an amount of adhesive that has been coated by the coating section reaches equal to or more than a predetermined value.

2 Claims, 11 Drawing Sheets

BOOKBINDING APPARATUS AND BOOKBINDING SYSTEM

This application is based on Japanese Patent Application No. 2006-300022 filed on Nov. 6, 2006, which is incorporated hereinto by reference.

BACKGROUND OF THE INVENTION

This invention relates to a bookbinding apparatus for forming a booklet by coating adhesive onto a spine of a sheet bundle and a bookbinding system.

A bookbinding apparatus for simply forming a booklet by combining a cover sheet, onto a bundle of a plurality of sheets onto which images have been formed by a copier and a printer, has been known. A general outline of bookbinding technology will be described. Firstly, a plurality of sheets, onto which images have been formed, are stacked and aligned to form a sheet bundle. Next, adhesive, such as glue is coated onto the spine of the stacked and aligned sheet bundle. Then a cover sheet is conveyed and stopped at a predetermined position to bind the cover sheet with the spine of the sheet bundle, onto which adhesive has been coated. The sheet bundle and the cover sheet are bound to form a booklet according to the sequence described above.

Since adhesive is consumed to be pasted onto the spine of a sheet bundle when a booklet is formed, a constant amount of adhesive has to be kept in the bookbinding apparatus in order to continuously form booklets. Unexamined Japanese Patent Application Publication No. 2004-209746 discloses a technology for keeping a constant amount of adhesive in a bookbinding apparatus.

In the bookbinding apparatus disclosed in Unexamined Japanese Patent Application Publication No. 2004-209746, an adhesive reservoir for storing melted high temperature adhesive is provided. A thermocouple is provided to detect the temperature inside the adhesive reservoir in this adhesive reservoir. In case when a remaining amount of adhesive in the adhesive reservoir is large, since melted adhesive contacts with the thermocouple, temperature detected by the thermocouple is high. However in case when the remaining amount of adhesive is small, melted adhesive does not contact with the thermocouple and the temperature detected by the thermocouple becomes lower. Thus, in case when the temperature detected by the thermocouple becomes lower than a predetermined temperature, it is considered that the remaining amount of adhesive agent is small, and solid adhesive is supplied to the adhesive reservoir. A constant amount of adhesive can be kept in the adhesive reservoir by the operations described above.

According to Unexamined Japanese Patent Application Publication No. 2004-209746, whether the remaining amount of the adhesive is small is determined by detecting the temperature inside the adhesive reservoir. However, due to the effect of a heater inside the adhesive reservoir, there is a case that the temperature detected by the thermocouple does not become equal to or lower than the predetermined temperature even though the remaining amount of adhesive is in a low level situation. As a result, there is a case that solid state adhesive is not supplied even though the remaining amount of adhesive is small and a bookbinding process is not properly conducted due to insufficient remaining amount of adhesive.

SUMMARY OF THE INVENTION

One aspect of the present invention is as follows.

A bookbinding apparatus for forming a booklet by coating adhesive onto a spine of a sheet bundle, is provided with, an adhesive tank for storing adhesive, a supplying section for supplying solid state adhesive to the adhesive tank, a melting section for melting the solid state adhesive supplied to the adhesive tank, a coating section for coating the adhesive onto the spine of the sheet bundle, and a controller for controlling the supplying section so as to supply the solid state adhesive from the supplying section to the adhesive tank when a coated adhesive amount by the coating section becomes equal to or more than a predetermined value.

Another aspect of the present invention is as follows.

A bookbinding system is provided with, an image forming apparatus for forming an image onto a sheet and the bookbinding apparatus described above for receiving the sheet outputted from the image forming apparatus and forming a booklet.

DETAILED DESCRIPTION OF THE PREFERRED EMBODIMENT

Figure 1:
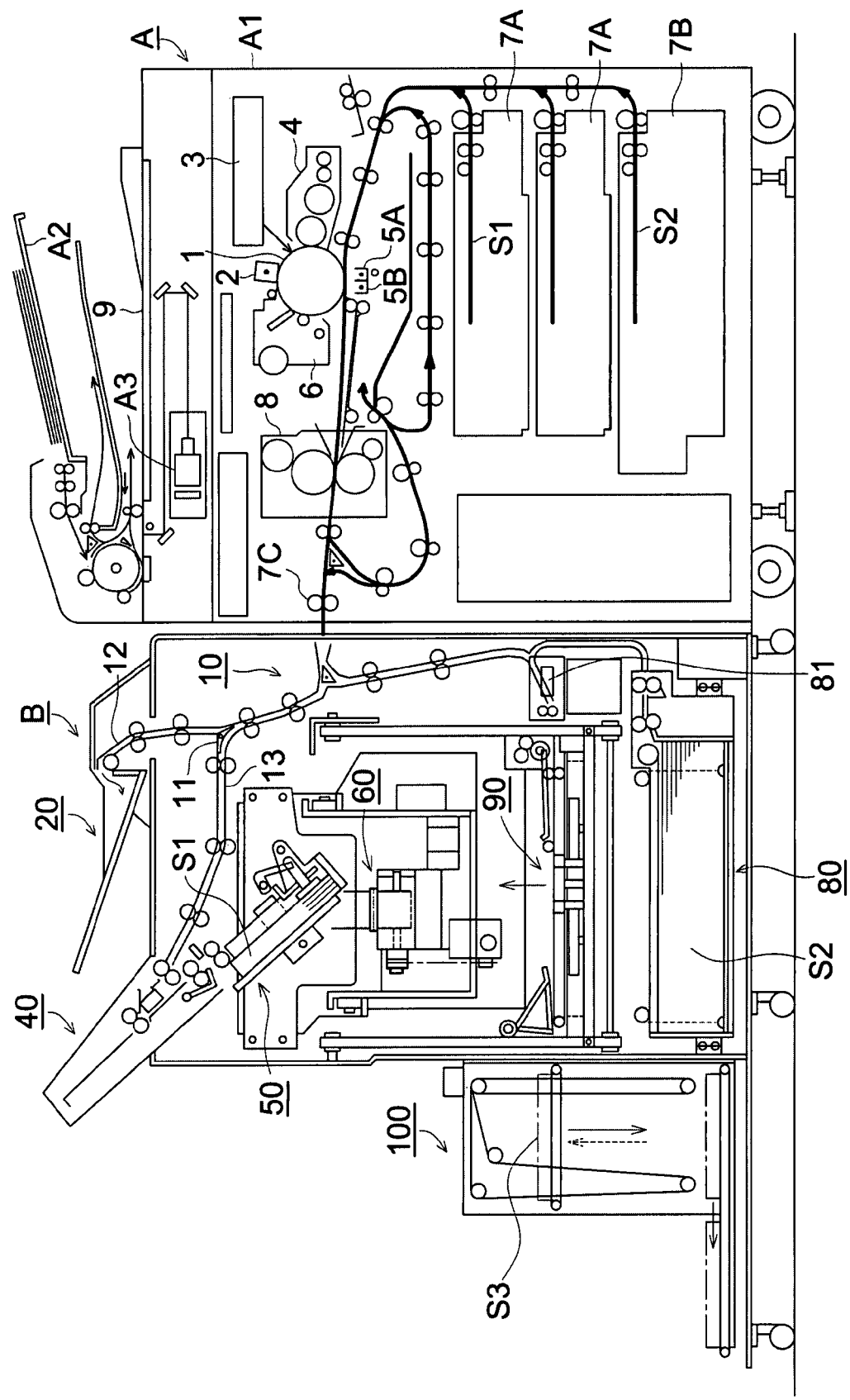
FIG. 1 illustrates a center cross sectional view of a bookbinding system.
Figure 2A:
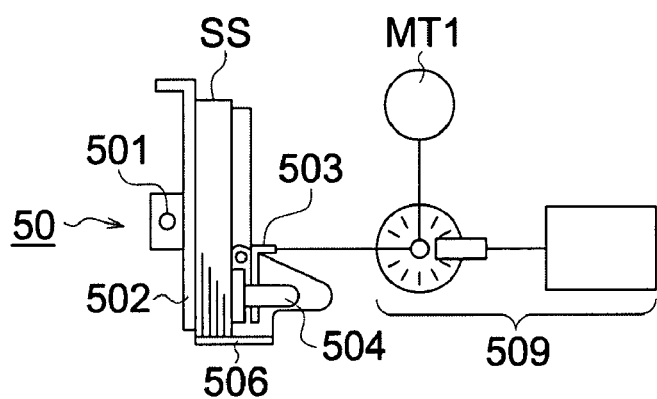
FIGS. 2(a)-2(d) illustrate a process for coating adhesive onto a sheet bundle.
Figure 2B:
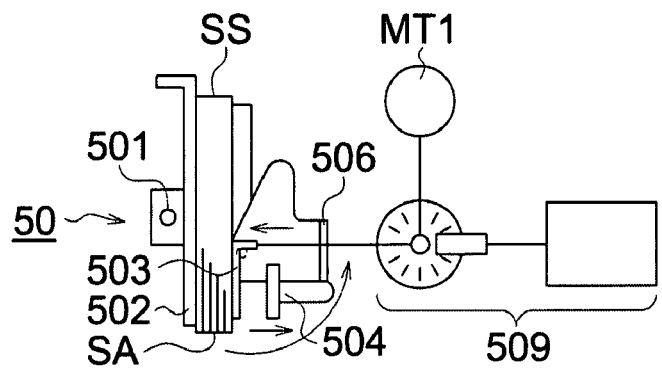
Figure 2C:
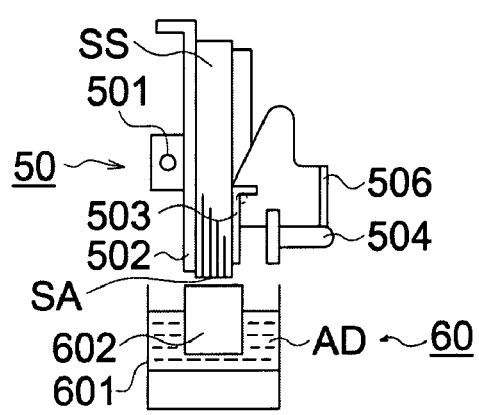
Figure 2D:
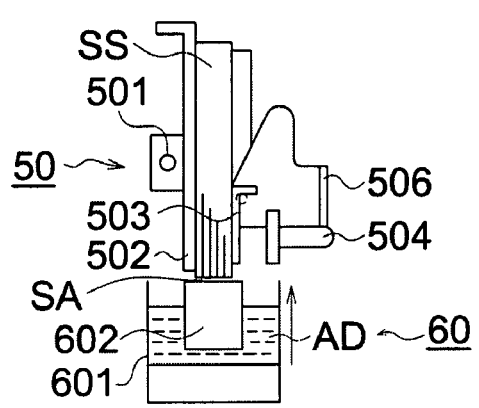

FIG. 1 illustrates a center cross sectional view of a bookbinding system.

The bookbinding system includes an image forming apparatus A and a bookbinding apparatus B.

The image forming apparatus A is an image forming apparatus for forming image onto a sheet by an electrophotographic system, which includes an imager forming section A1, a document feeder A2 and an image reading section A3. In the image forming section A1, a charging unit 2, an exposing unit 3, a developing unit 4, a transfer unit 5A, a separation unit 5B and a cleaning unit 6 are disposed around a drum type photoreceptor 1. In the image forming section A1, respective processes, such as a charge process, an exposing process and a developing and transfer processes are executed and a toner image is formed onto a sheet S1 and a cover sheet S2. Sheets S1, which will be covered by a cover sheet S2 when the sheets S1 are formed into a booklet, are stored in a sheet feeding tray 7A and cover sheets S2 are stored into a sheet feeding tray 7B and a cover sheet storing section 80. A sheet S1 and a cover sheet S2 will be ejected respectively from the sheet feeding trays 7A and 7B one by one and conveyed to the image forming section A1. The sheet S1 and the cover sheet S2, onto which toner images have been respectively formed, pass through a fixing apparatus 8 and a fixing process will be applied. The sheet S1 and the cover sheet S2, to which a fixing process has been applied, will be ejected outside the image forming apparatus A from an ejection roller 7C.

The image forming apparatus A in this embodiment is an image forming apparatus for forming a monochrome image on a sheet by an electrophotographic system. However, the present invention is not limited to this embodiment. Needless to say, the image forming apparatus A may be a color image forming apparatus and any image forming system other than the electrophotographic system.

The bookbinding apparatus B receives sheets S1 outputted from the image forming apparatus A, bundles a plurality of sheets S1 to make a sheet bundle and binds the cover sheet S2 with the sheet bundle to form a booklet. The bookbinding apparatus B includes a conveyance section 10, a sheet ejection try 20, a sheet reversing section 40, a stacking section 50, a coating unit 60, a binding section 90 for binding the cover sheet S2 with the sheet bundle and a booklet ejection unit 100. The sheet S1 conveyed from the image forming apparatus A to the bookbinding apparatus B is either ejected to sheet ejection tray 20 via an ejection path or conveyed to a sheet reversing unit 40. The sheet S1 is ejected to the sheet ejection tray 20 when bookbinding is not conducted in the bookbinding apparatus B.

In the bookbinding apparatus B, the sheet S1 is conveyed to the sheet reversing unit 40 via a conveyance path 13 and conveyed to the stacking section 50 after being switched back at the sheet reversing unit 40. In the stacking section 50, the setting number of sheets S1 is stacked and when the number of sheet S1 has reached to a predetermined value, the stacking section rotates and the bundle of sheets S1 is kept in a substantially vertical posture. Then, adhesive is coated on the spine of the bundle of sheets S1, which is a lower surface, by the coating unit 60, the cover sheet S2 comes into contact with the bundle of sheet S1 and is bound to bundle of the sheet S1. The booklet S3 formed by binding the sheet S2 with the bundle of sheet S1 is ejected to a booklet ejection unit 100.

The cover sheet S2 is stored not only in the sheet feeding tray 7B but also in a cover sheet storing section 80. In case when forming an image onto the cover sheet S2, the sheet S2 will be ejected from the sheet feeding tray 7B and in case when no-image is formed onto the cover sheet S2, the cover sheet storing section 80, the sheet S2 will be ejected from the cover sheet storing section 80. In case when the cover sheet S2 is a long infinite size, a cutter 81 cuts the cover sheet S2 according to size information of the sheet S1 and thickness information of the sheet bundle.

FIGS. 2(*a*)-2(*d*) illustrate a process for coating adhesive onto a sheet bundle.

A motor MT1 moves a second interposing member 503 toward a sheet bundle SS, which is a bundle of the sheet S1. In case when the second interposing member 503 presses the sheet bundle SS with a constant pressure, a torque detection sensor (not shown) detects the increase of driving torque of the motor MT1, and the movement of the second interposing member 503 stops. Based on this configuration described above, the sheet bundle SS is securely interposed by the first interposing member 502 and the second interposing member 503. An encoder 509 measures the moving amount of the second interposing member 503 and a RAM stores the moving amount of the second interposing member 503. The method for measuring the thickness of the sheet bundle SS will be described later.

At the step when the sheet bundle SS is interposed by the first interposing member 502 and the second interposing member 503, a receiving table 506 rotates 90° to be retreated as illustrated in FIG. 2(*b*). At the step when the receiving table 506 has retreated, still a coating roller 602, which will function as the coating section, has not contacted with the lower surface of the sheet bundle SS (refer to FIG. 2(*c*)).

Next, as illustrated in FIG. 2(*d*), the coating unit 60 storing adhesive AD rises and the coating roller 602 contacts with the lower surface SA, which is spine of the sheet bundle SS. Then the coating unit 60 moves along the lower surface of the sheet bundle SS to coat the adhesive AD onto the lower surface of the sheet bundle SS.

Figure 3:
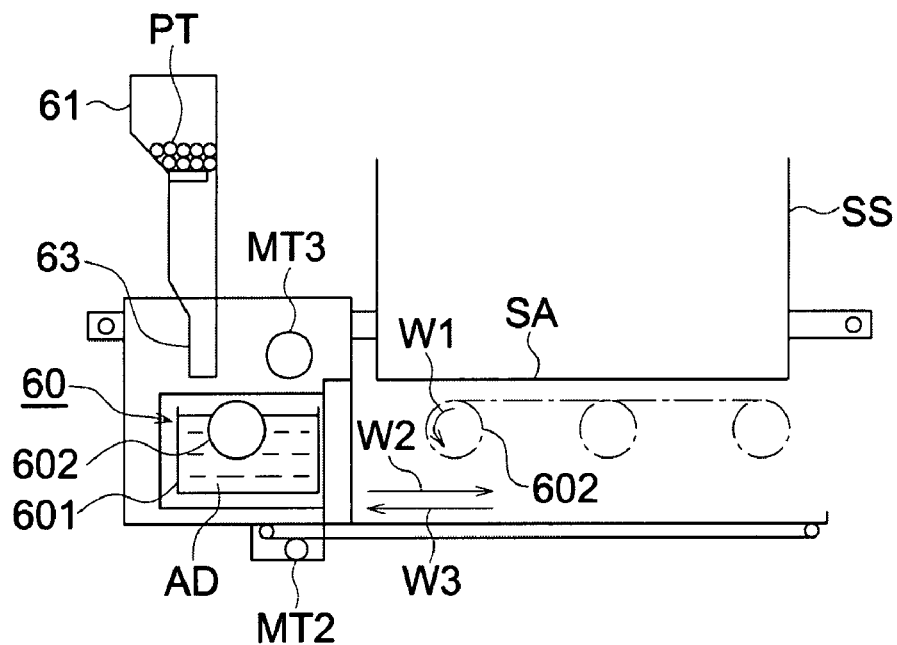
FIG. 3 illustrates other process for coating adhesive onto a sheet bundle.

FIG. 3 illustrates other process for coating adhesive onto a sheet bundle.

The motor MT2 reciprocally moves the coating unit 60 including the coating roller 602 in arrow directions W2 and W3. The motor MT3 rotates the coating roller 602 in an arrow direction W1 while the coating roller 602 moves forward and moves backward. In case when the coating roller 602 rotates in the arrow direction W1, the adhesive AD is drawn from the adhesive tank 601 and the coating roller 602 coats the adhesive AD to the lower surface SA of the sheet bundle SS.

The home position of the coating unit 60 is a position located in left side in FIG. 3 (the position in a rear side viewed from the front surface of the bookbinding apparatus B illustrated in FIG. 1). In this home position, pellets PT, which are solid state adhesive, are supplied to the adhesive tank 601 via a supply pipe 63.

Figure 4:
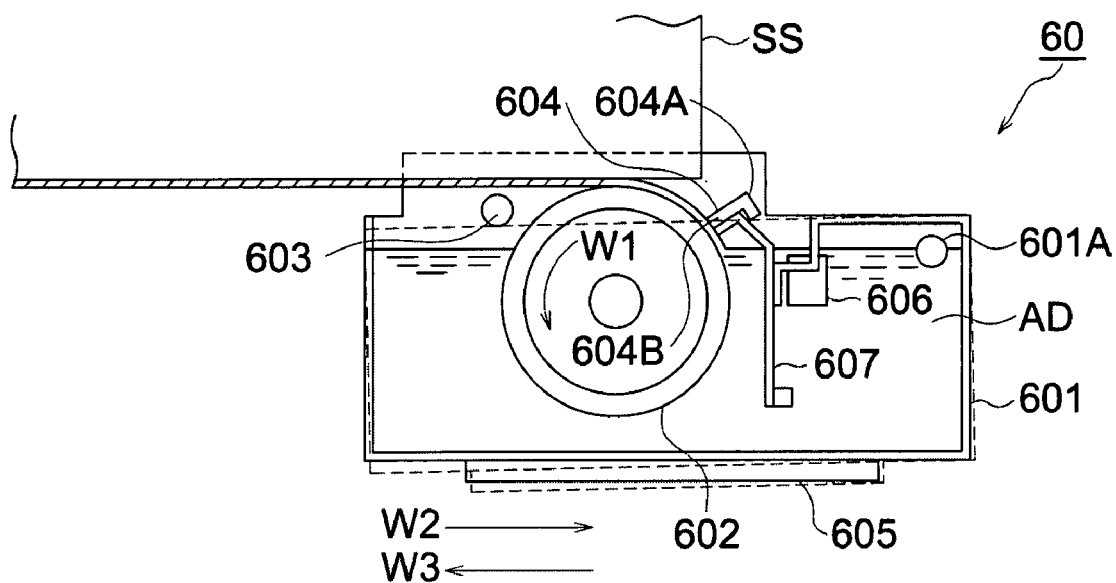
FIG. 4 illustrates a structure of a coating unit 60.

FIG. 4 illustrates a structure of the coating unit 60.

The coating unit 60 includes an adhesive tank 601 for storing adhesive AD, a coating roller 602, a regulation members 603 and 604, a heater 605 for functioning as a melting section and remaining amount detection sensor 606 for functioning as a detection section.

The heater 605 heats and melts the palettes PT supplied to the adhesive tank 601 to form melted state adhesive AD. The remaining amount detection sensor 606 is arranged to detect and control the adhesive AD amount stored in the adhesive tank 601 so that the liquid surface keeps constant.

The regulation member 603 is a bar shaped member having a substantially circle in a cross sectional view.

A support member 607 having a plate style supports the regulation member 604. The lower end edge 604B of the regulation member 604 regulates the adhesive layer thickness on the coating roller 602 and the upper end edge of the 604A of the regulation member 604 regulates the adhesive layer thickness on the lower surface of the sheet bundle SS.

The adhesive tank 601 swings centering on a shaft 601 and moves from a waiting position illustrated in a dashed line to a coating position illustrated in a solid line. The remaining amount detection sensor 606 includes a temperature detection element configured by a thermistor and detects the temperature inside the adhesive tank 601. In case when the remaining amount detection sensor 606 contacts with the melted state adhesive AD, the detected temperature is high and in case when the remaining amount detection sensor 606 does not contact with the melted state adhesive AD, the detected temperature decreases. Thus, in case when the adhesive amount of the adhesive tank 601 becomes not more than a predetermined amount, the temperature detected by the remaining amount detection sensor 606 becomes not more than a predetermined temperature. In case when a remaining adhesive amount decreased detection signal is outputted, pellets PT are to be supplied. As described above, by detecting the temperature inside the adhesive tank 601 by the remaining amount detection sensor 606, the remaining amount of adhesive can be easily detected.

The supplying section 61 will be described by referring to FIGS. 5-8(*b*).

Figure 5:
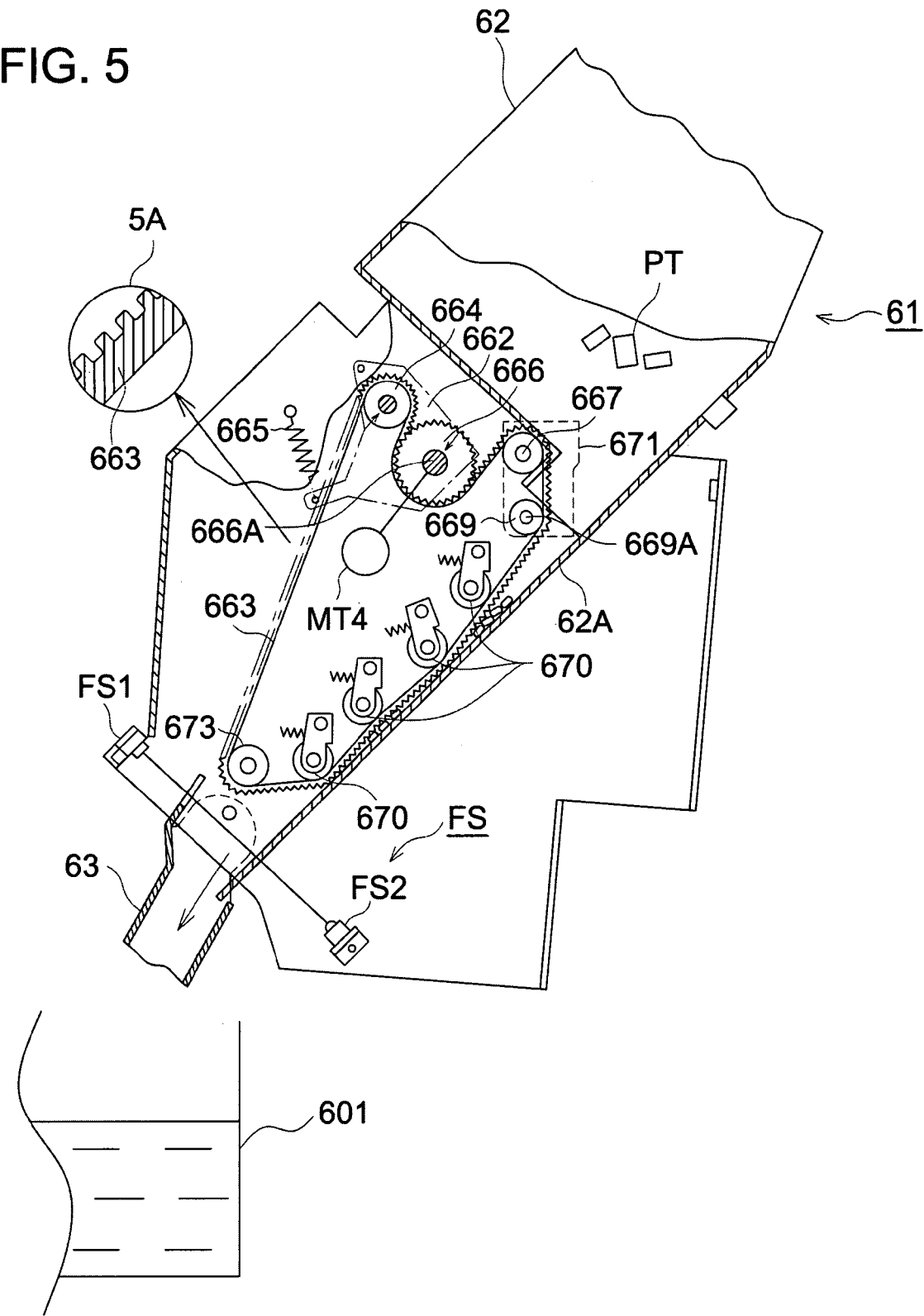
FIG. 5 illustrates a cross sectional view of supplying section 61.

FIG. 5 illustrates a cross sectional view of supplying section 61.

A hopper 62 for storing pellets PT, which are solid state adhesive, and a supply pipe 63 structures the supply section 61. A frame 62A structuring the hopper 62 supports various parts, which will be described below.

The supply section 61 is structured so that the hopper 62 and the supply pipe 63 are in the state shown in FIG. 5, that is, a declined state with a left side being down. The pellets PT drop along the frame 62A and the bottom of the supply pipe 63. The pellets PT are supplied to the adhesive tank 601.

FS denotes a supply sensor for detecting pellets PT dropping from hopper 62, the supply sensor FS being configured by a light emitted element FS1 and a photo detector FS2. The supply sensor FS detects the number of pellets PT supplied to the coating unit 60. The number of the pellets PT counted by the supply sensor FS is proportion to the number of pellets PT to be supplied.

The belt 663 for conveying pellets PT is entrained about rollers 664, 666, 667, 669 and 673 in the lower portion of the hopper 62. A roller 666 is a drive roller, which is driven by the motor MT4, and the roller 666 rotates counterclockwise.

The belt 663 is formed so that the outer circumference surface shaped in uneven as illustrated in FIG. 5A. Since the outer circumference of the belt 663 is unevenly formed, the belt 663 can surely convey pellets PT. Further, since the contact area between belt 663 and the pellets PT is small, stickiness of pellets PT to the belt 663 can be prevented.

Four pressure rollers 670 urged by springs press the belt 663 to the frame 62A. By pressing the belt 663 toward the frame 62A, pellets PT amount conveyed by the belt 663 can be controlled constant.

The rollers 664 and 666 are supported by a support plate 662, which is capable of swinging centering on the rotational shaft 666A. The support plate 662 is urged in the clockwise by a pull type spring 665. Based on this structure described above, a constant tension is given to the belt 663.

Figure 6:
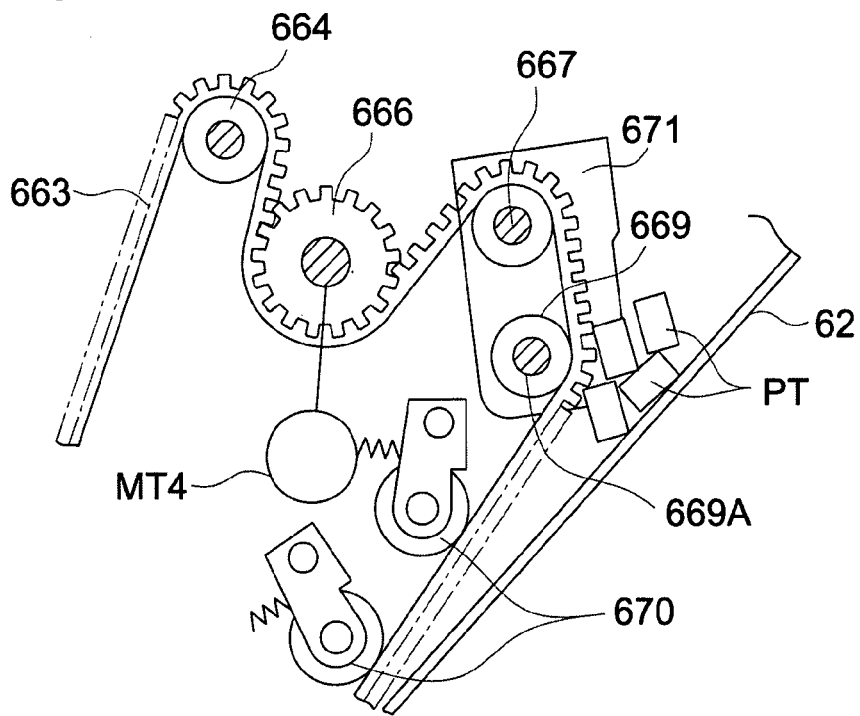
FIG. 6 illustrates an explanation drawing for showing a situation before the supplying section 61 starts a supplying operation.

FIG. 6 illustrates a situation before the supplying section 61 starts a supplying operation. The roller 669 makes an ejection exit for pellets PT small. The pellets PT are blocked by the belt 663 supported by the roller 669 and stored in the hopper.

Figure 7:
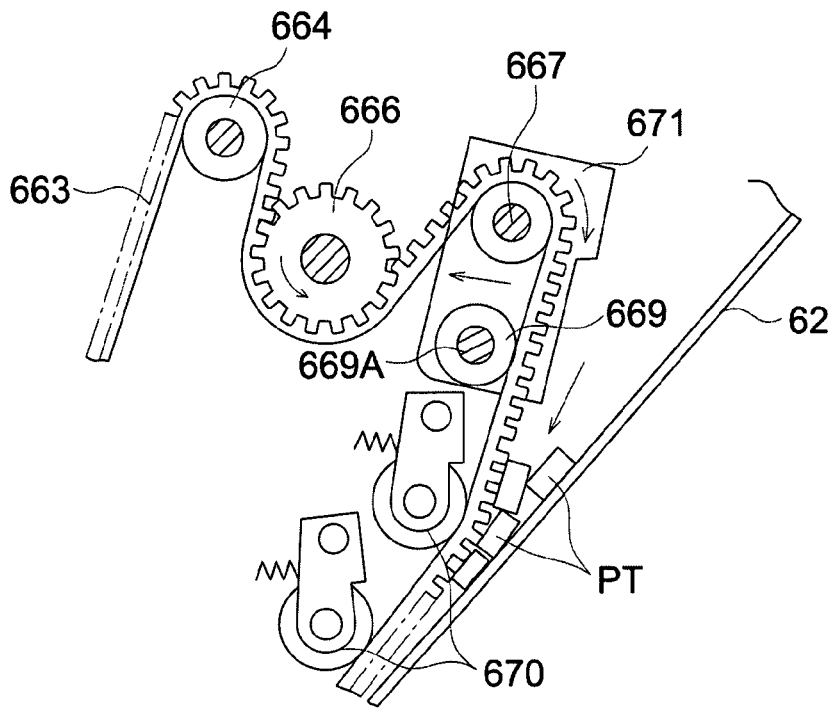
FIG. 7 illustrates an explanation drawing for showing a situation after the supplying section 61 has started a supplying operation.

FIG. 7 illustrates a situation after the supplying section 61 has started a supplying operation. Once the supplying operation has started, the roller 669 moves toward left side and the belt 663 moves backward. Since the belt 663 moves backward, the ejection exit for pellets PT becomes wide. Thus, pellets PT drop. The dropped pellets PT is to move along the bottom surface of the frame 62A according to the conveyance operation of belt 663.

The roller 669 reciprocally moves between the position illustrated in FIG. 6 and the position illustrated in FIG. 7 while the supplying section conducts supplying operation. Based on this reciprocal operation, pellets PT is controlled so that a small amount of pellets PT drop and is supplied to the adhesive tank 601.

Figure 8:
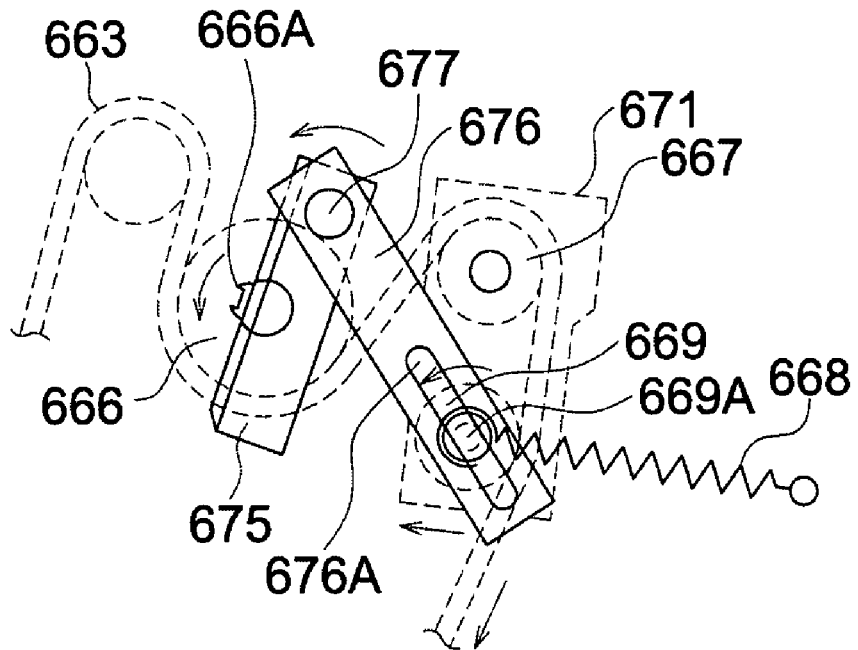
FIGS. 8(a)-8(b) illustrate an explanation drawing for showing a driving mechanism for reciprocally moving a roller 669.
Figure 8:
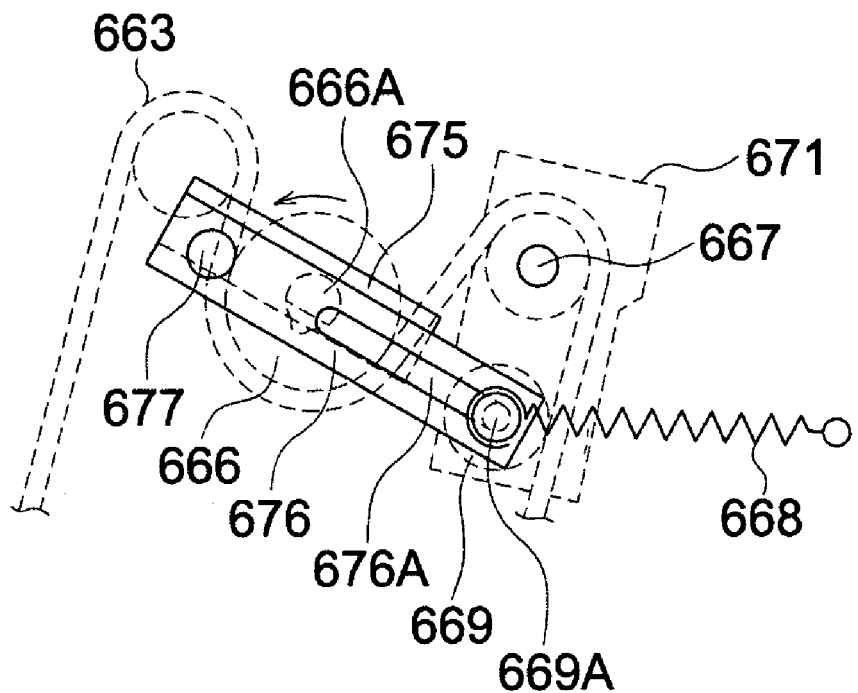

A driving mechanism for reciprocally moving the roller 669 will be described by referring to FIGS. 8(*a*)-8(*b*).

The support plate 675, which rotates together with the roller 666, is fixed to the shaft 666A of the roller 666. A link 676 is supported by a pin 677 provided at one end of the support plate 675 so that the link 676 can rotate. The shaft 669A of the roller 669 is inserted into an elongated circular hole 676A provided with the link 676. The shaft 669A of the roller 669 is urged toward right side in FIGS. 8(*a*)-8(*b*) by a pull type spring 668. Therefore, the roller 669 is held at a predetermined position by the tension of the belt 663 and the pre-loaded force of the spring 668. In case when the roller 666 rotates, the support plate 675 also rotates. Based on the rotation of the support plate 675, the right end of the link 676 moves left and right in FIG. 7. Based on this movement, the position of the roller 669 moves left and right and the pellet eject exit mouth of the hopper 62 is expanded as the situation illustrated in FIG. 6 and reduced as the situation illustrated in FIG. 7. These reduction and expansion operations are repeated in a supplying operation and pellets PT are supplied to the adhesive tank 601 a small quantity by a small quantity with a controlled rate.

The coating unit 60 and the supply section 61 in the bookbinding apparatus B have been described above. Next the remaining amount of adhesive in the adhesive tank 601 will be described hereinafter.

The remaining amount detection sensor 606 in the adhesive tank 601 detects the temperature inside the adhesive tank 601. In case when remaining adhesive amount becomes not more than a predetermined amount, the detected temperature becomes not more than the predetermined temperature. However, even though the remaining amount of the adhesive in the adhesive tank is low, there is a case that due to the effect of the heater 605 in the adhesive reservoir, the temperature detected by the remaining amount detection sensor 606 does not become equal to or less than the predetermined temperature. As a result, even though the remaining amount of the adhesive in the adhesive tank is low, there is a case pellets PT are not supplied from the supplying section 61 and the formation of booklet is not properly conducted because of the insufficiency of adhesive.

Thus, in addition to the supply control based on the remaining amount detection result, pellets PT are supplied based on the adhesive amount, which has been coated by the coating roller 602. Since the adhesive amount, which has been coated by the coating roller 602, corresponds to the thickness of the sheet bundle SS, pellets PT are supplied to the adhesive tank 601 based on the measurement result obtained by measuring the thickness of the sheet bundle SS in this embodiment. This will be described in detail by referring to FIGS. 9-14.

Figure 9:
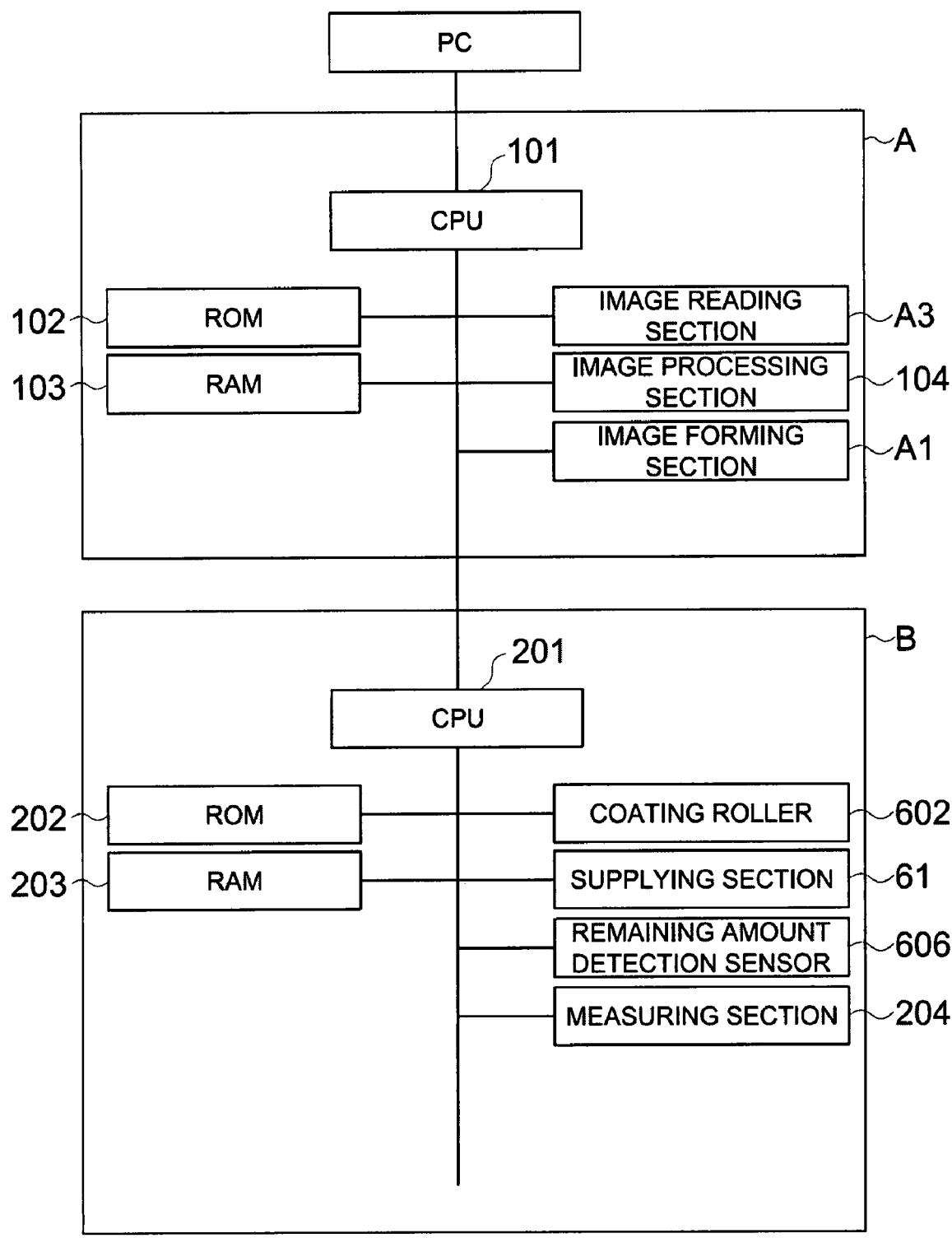
FIG. 9 illustrates a block diagram of a control system in a bookbinding system.

FIG. 9 illustrates a block diagram of a control system in a bookbinding system. The block diagram illustrated in FIG. 9 is a representative one.

A PC, which is a terminal, such as a personal computer and the bookbinding apparatus B are connected to the image forming apparatus A.

A CPU 101 is arranged to control the total operation of the image forming apparatus A. A ROM (Read Only Memory) 102 and a RAM (Random Access Memory) 103 are connected to the CPU 101. This CPU 101 reads out various control programs stored in the ROM 102, extends them in the RAM 103 and controls respective sections. Further, the CPU 101 executes various programs extended in the RAM 103 and stores the processed results into the RAM 103. Then, the CPU 101 stores the processed results stored in the RAM 103 to a predetermined storage target.

A image processing section 104 conducts an image process of the image data generated by an image reading section A3 and the image data transmitted from the PC connected to the image forming apparatus A. The image forming section A1 receives the image data processed by the image processing section 104 and forms an image onto a sheet.

A CPU 201 (a controller) in the bookbinding apparatus B is arranged to control the total operations of the bookbinding apparatus B. The CPU 201 executes the operation for forming a booklet based on a predetermined timing based on the signals transmitted from the image forming apparatus A. The CPU 201 reads out various programs stored in the ROM 202, extends them in the RAM 203 and controls the operations of respective sections.

The CPU 201 controls the operations of the coating roller 602 and the supplying section 61. The CPU 201 determines whether supplying solid state pellets PT from the supplying section 61 to the adhesive tank 601 based on the temperature detected by the remaining amount detection sensor 606.

A measuring section 204 is arranged to measure the thickness of the sheet bundle SS. Based on the thickness measured by the measuring section 204, the CPU 201 determines whether supplying pellets PT from the supplying section 61 to the adhesive tank 601.

The measuring operations for measuring the thickness of the sheet bundle SS by using the measuring section 204 will be described by referring to FIG. 10 and FIGS. 11(a)-11(d).

Figure 10:
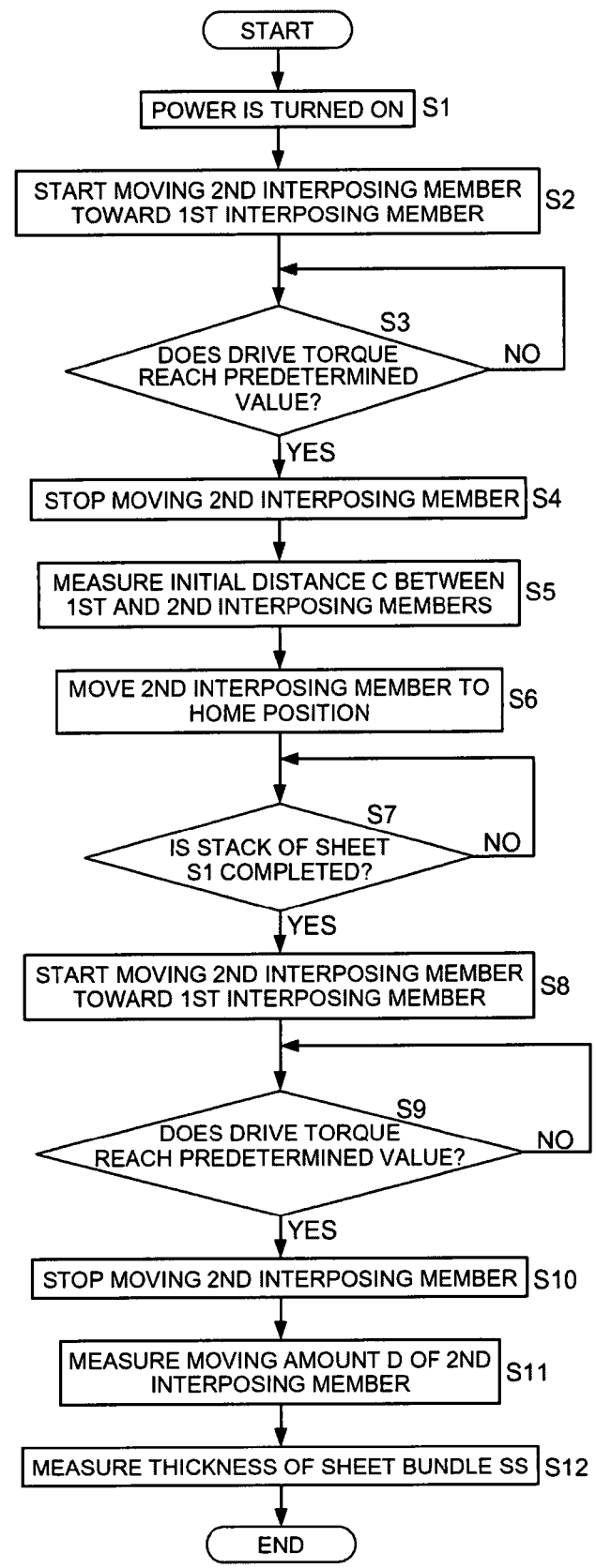
FIG. 10 illustrates a flowchart for showing an operation for measuring the thickness of a sheet bundle.
Figure 11:
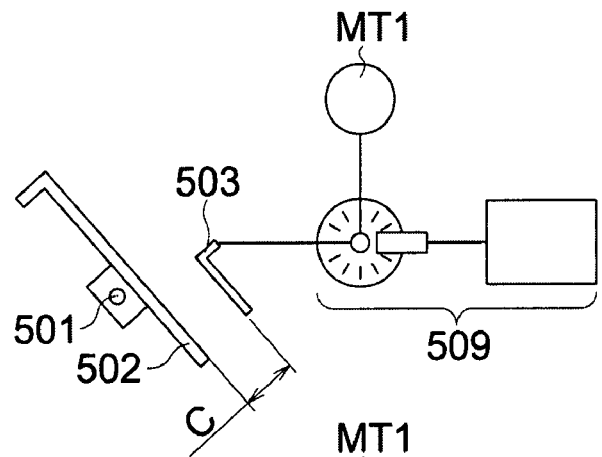
FIGS. 11(a)-11(d) illustrate an explanation drawing pertaining to an operation of the first interposing member 502 and the second interposing member 503.
Figure 11:
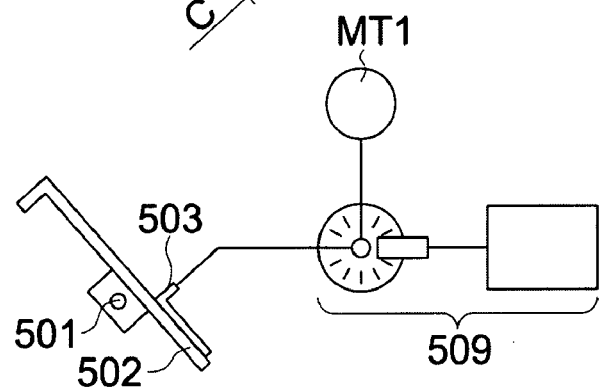
Figure 11:
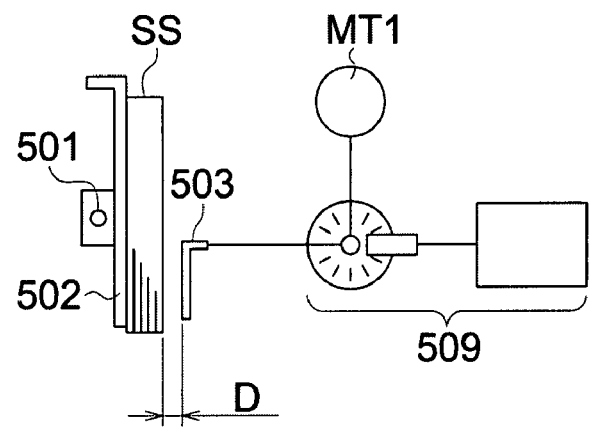
Figure 11:
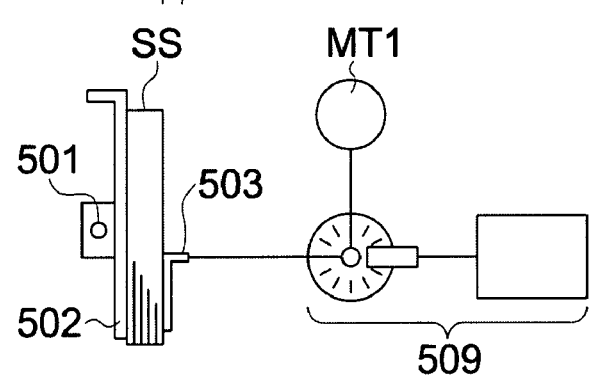

FIG. 10 illustrates a flowchart for measuring the thickness of a sheet bundle SS. Each of FIGS. 11(a)-11(d) illustrates an explanation drawing pertaining to an operation of the first interposing member 502 and the second interposing member 503. In order to easily understand the measuring method, unnecessary portions are omitted in FIGS. 11(a)-11(d).

FIG. 11(a) illustrates a situation where there is no sheet S1 of bundle SS between the first interposing member 502 and the second interposing member 503 and the both interposing members are declined. The second interposing member 503 is located at an initial position. The measurement of the initial distance C between the first interposing member 502 and the second interposing member 503 will be conducted in this state.

Firstly, when the power of the bookbinding apparatus B in the bookbinding system is turned on (S1 in FIG. 10), the program for a measuring program for measuring the initial distance C is read out from the RAM 203 and the CPU 201 executes a measuring operation. The CPU 201 operates a motor MT1 to move the second interposing member 503 from the initial position to the first interposing member 502 (S2 in FIG. 10). A driving torque detection sensor (not shown) detects whether the driving torque of the motor MT1 has reached to a predetermined value (S3 in FIG. 10).

When having detected that the driving torque of the motor MT1 has reached to the predetermined value, the CPU 201 stops the movement of the second interposing member 503 (S4 in FIG. 10). When the movement of the second interposing member 503 stops, as illustrated in FIG. 11(b), the first interposing member 502 and the second interposing member 503 are in a contact state. Since the moving amount of the second interposing member is measured by the encoder 509, this moving amount becomes the initial distance C between the first interposing member 502 and the second interposing member 503 (S5 in FIG. 10).

The measured initial distance C is stored in the RAM 203. When having completed the measurement of the initial distance C, in order to stack the sheet bundle SS, the second interposing member 503 is moves to initial position (S6, in FIG. 10). Next, when the stacking operation has completed (S7 in FIG. 10), the first interposing member 502 and the second interposing member 503 rotate on a shaft 501 and become into a situation where the first interposing member 502 and the second interposing member 503 are in a vertical posture, while keeping the initial distance C. Then the thickness of the sheet bundle SS is measured by a measuring section 204 in the bookbinding apparatus B. The measuring section 204 includes the first interposing member 502, the second interposing member 503, the motor MT1, the driving torque detection sensor and the encoder 509 for detecting the moving amount of the second interposing member. Firstly, the CPU 201 moves the second interposing member 503 toward the first interposing member 502 (S8 in FIG. 10). Then the driving torque detection sensor detects whether the driving torque of the motor MT1 has reached to a predetermined value (S9 in FIG. 10). When having detected that the driving torque has reached to the predetermined value, stop the movement of the second interposing member 503 (S10 in FIG. 10). When having stopped the movement of the second interposing member 503, the second interposing member 503 and the sheet bundle SS are in a contact state as illustrated in FIG. 11(d). The moving amount of the second interposing member (corresponding to D in FIG. 11(c)) has been measured by the encoder 509. Then read out the measured initial distance C from the RAM 203 and subtract the moving amount D from the initial distance C. Then the thickness of the sheet bundle SS can be measured (S12 in FIG. 10). The measuring method illustrated in FIGS. 11(a)-11(d), is a method for measuring the thickness of the bundle of the sheet S1 by moving the second interposing member 503 by the motor MT1. However, the invention is not limited to the embodiment where moving the second interposing member. It may be an embodiment where moving the first interposing member 502 instead of the second interposing member 503. Or, it may be an embodiment where the first interposing member 502 and the second interposing member 503 are connected to the encoder and both interposing boards are moved to measure the thickness of the bundle of the sheets S1.

Next, the operation of supplying palettes PT from the supplying section 61 to the adhesive tank 601 will be detailed.

Figure 12:
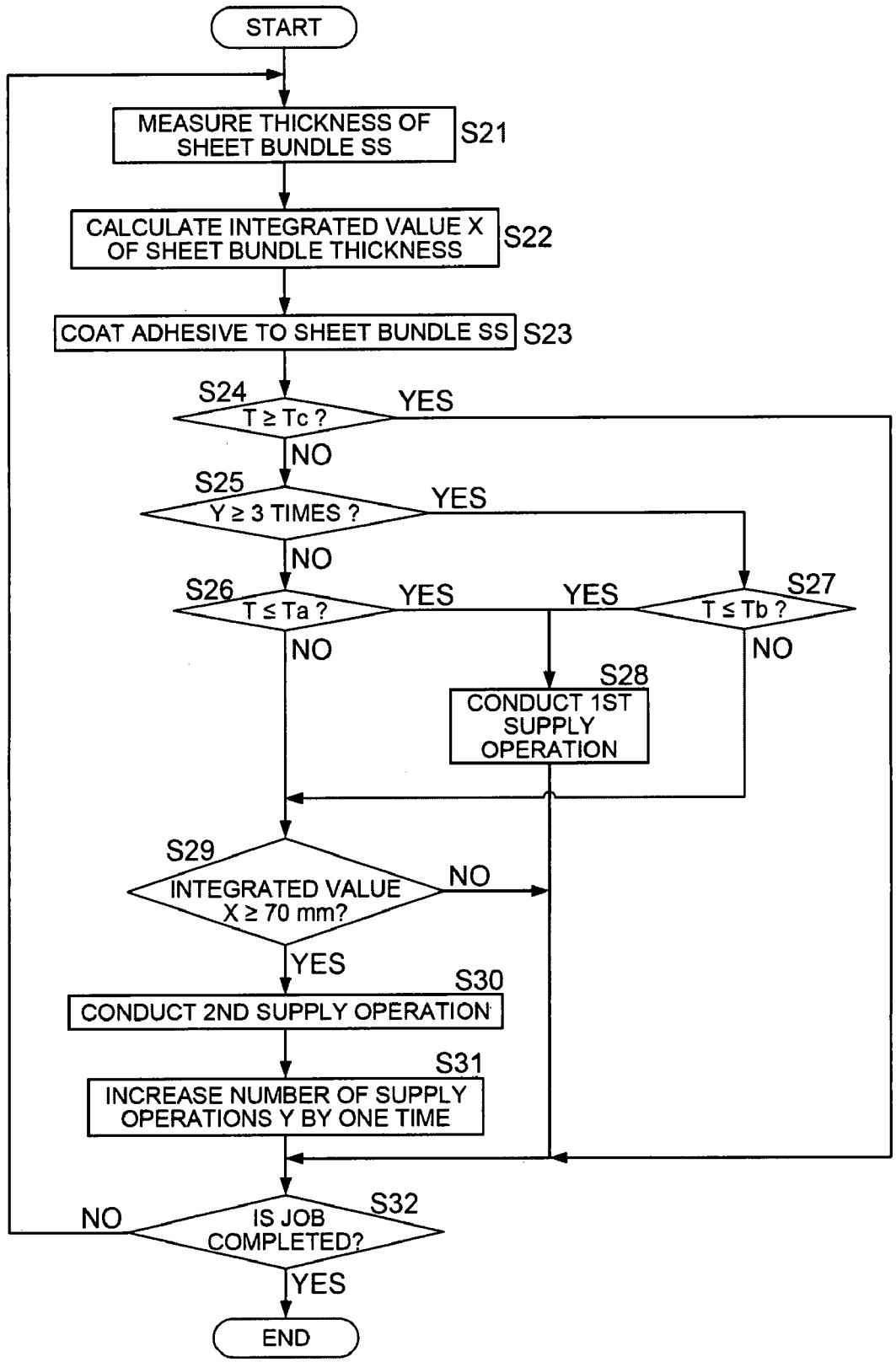
FIG. 12 illustrates a flowchart showing an operation of supplying pellets PT.

FIG. 12 illustrates a flowchart showing an operation of supplying pellets PT.

When the operation for forming a booklet starts, first of all, the thickness of sheet bundle SS is measured (step S21). The method of measuring the thickness of the sheet bundle SS has been described by referring to FIG. 10 and FIGS. 11(a)-11(d).

When measuring the thickness of the sheet bundle SS, the CPU 201 calculates the integrated value X of the thickness of sheet bundle SS (step S22). This integrated value X is calculated to determine whether the second supply operation should be conducted in a step S29. In the case of the operation for forming the first booklet, the integrated value X is the thickness of the sheet bundle SS for the first booklet. In the case of the operation for forming the second booklet, the integrated value X will be the thickness, to which the sheet bundle SS for the first booklet and the sheet bundle of SS for the second booklet have been added. Every time when the thickness of the sheet bundle SS is measured, the integrated value X is stored in the RAM 203.

Once the CPU 201 has calculated the integrated value X of the thickness of the sheet bundle SS, the coating roller 602 coats adhesive onto the sheet bundle SS (step S23). After that the remaining amount detection sensor 606 detects the temperature T inside the adhesive tank 601. Then, the CPU 201 compares the detected temperature T with a supply prohibit temperature Tc to determine whether the detected temperature T is higher than the supply prohibit temperature TC (step S 24). Since the temperature of adhesive in a melting state is high, when the CPU 201 has determined that the temperature inside the adhesive tank is higher than the supply prohibit temperature TC, it can be determined that adequate adhesive is stored in the adhesive tank 601. Under these situations, if pellets PT were supplied to adhesive tank 601, there is a possibility that adhesive overflows from the adhesive tank 601. Therefore, the CPU 201 compares the detected temperature T with the supply prohibit temperature Tc. In case when the detected temperature T is higher than the supply prohibit temperature Tc (step S24: Yes), the CPU 201 does not supply pellets PT and moves the operation to the step of determining whether the job has completed (step S32). The supply prohibit temperature Tc is for example 150°, and the determination in the step 24 is conducted by the CPU 201. In case when the detected temperature T is lower than the supply prohibit temperature Tc (step S24: No), further CPU 201 moves operation to the step of determining whether pellets PT should be supplied to the adhesive tank 601.

Firstly, the CPU 201 determines whether the number of executions of the second supply operation is equal to or more that three times (step S25). The second supply operation is a supply operation executed based on the integrated value X of the thickness of the sheet bundle SS, which will be as described later. The determination of step S25 is conducted to determine whether a predetermined temperature, which is a reference temperature to determine the adhesive amount in the adhesive tank 601, should be set at Ta or Tb. For example, Ta is to be set at 132° and the Tb is set at 127° and the temperature difference is set 5°.

In case when the temperature detected by the remaining detection sensor 606 inside the adhesive tank 601 is equal to or lower than the predetermined temperature, the CPU 201 determines that the adhesive amount is small and in case when the detected temperature is higher than the predetermine temperature, the CPU 201 determines that the adhesive amount is large. However, there is a case that the predetermined temperature suitable for detecting the adhesive amount is different in response to the environment where the bookbinding apparatus B is set. For example, in case when setting the bookbinding apparatus under a certain environment, there is a case when setting a low predetermined temperature Ta, adhesive amount can be further properly detected. Further, in case when setting the bookbinding apparatus under other certain environment, there is a case when setting a higher predetermined temperature Tb, adhesive amount can be further properly detected.

Therefore, firstly, the CPU 201 determines the adhesive amount by referring to the lower predetermined temperature Ta. After CPU 201 has determined that the adhesive amount is large by referring to the low predetermined temperature Ta, if the second supply operation is conducted based on the integrated value X of the thickness of the sheet bundle SS, it can be determined that the reference temperature Ta is not proper reference temperature. Then, in case when the second supply operation is conducted equal to or more than three times, the predetermined temperature will be changed so that the higher predetermined temperature Tb is used as a reference temperature. Namely, in case when the execution number of the second supply operation is less than three times (step S25: No), the low predetermined temperature Ta is set as the reference. In case when the execution number of the second supply operation is equal to or more than three times (step S25: No), the high predetermined temperature Tb is set as the reference. An embodiment where the reference temperature may be fixes to either Ta or Tb may be acceptable.

Next, in case when the temperature T detected by the remaining amount detected sensor 606 inside the adhesive tank 601 is lower than the predetermined temperature Ta and Tb in the steps S26 and S27, since the adhesive amount in the adhesive tank 601 is determined to be small, the CPU 201 executes the first operation (step S28).

The first supply operation will be described by referring to FIG. 13.

Figure 13:
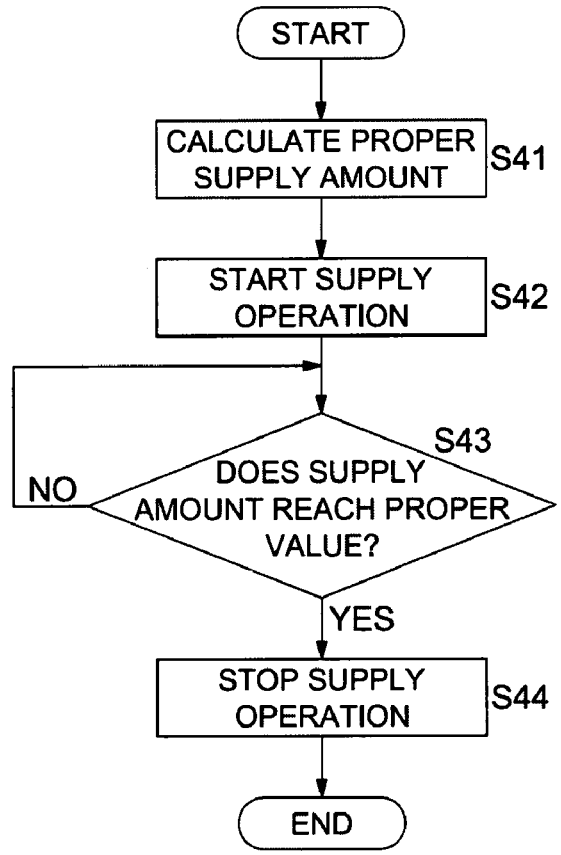
FIG. 13 illustrates a flowchart showing the first supply operation.

FIG. 13 illustrates a flowchart showing the first supply operation.

Figure 14:
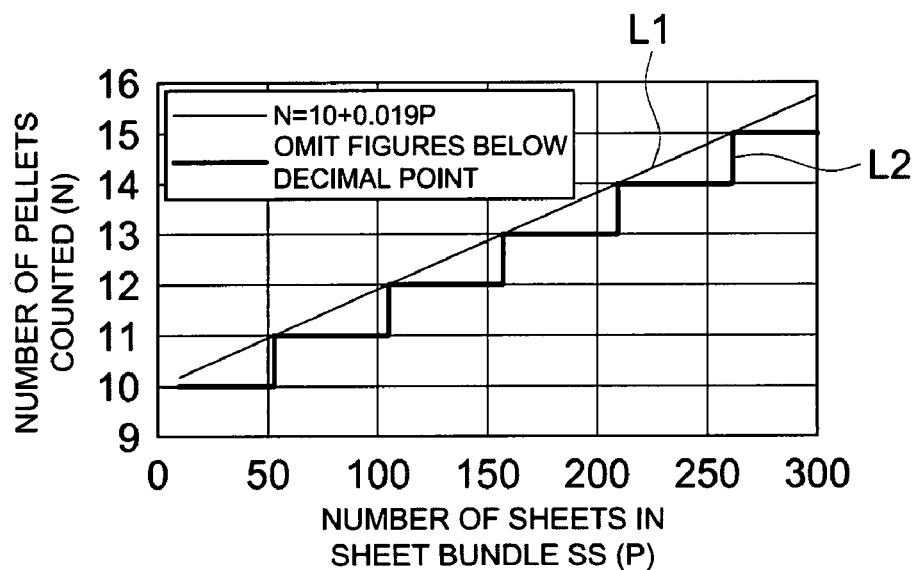
FIG. 14 illustrates a graph showing the relationship between the number of sheet bundle SS and a supply amount of pellets PT.

A proper supply amount of pellets PT, which is solid state adhesive, will be calculated (step S41). The supply amount of pellets PT is determined based on the number of sheets of the sheet bundle SS formed into a booklet just before the calculation. FIG. 14 illustrates a graph showing the relationship between the number of sheet bundle SS and a supply amount of pellets PT. In FIG. 14, the lateral axis denotes the number of sheets P in the sheet bundle SS and the vertical axis denotes the count number N of the pellets PT to be supplied counted by the supply sensor FS. FIG. 14 shows the results obtained by conducting a coating experience by using the coating unit 60.

The straight line L1 showing the proper supply amount will be expressed by the following formula.

$$N = 10 + 0.019P \qquad (1)$$

The count number N of the supply sensor FS does not always coincide with the number of pellets PT to be supplied. In this experiment example, one count of the supply sensor FS corresponds to 2.5 of pellets PT. As shown in a line L2, the actual supply amount is formed into a count number by omitting the figures below decimal point. The characteristic data illustrated in FIG. 14 has been stored in ROM 201 and the CPU 201 calculates the supply amount by referring to this characteristic data.

In case when the CPU 201 has calculated the supply amount, the CPU 201 starts the supply operation (step S42). The supply operation is conducted by activating the motor MT4 in the supply section 63 to supply pellets PT.

The CPU 201 determines whether the supply amount has reached to the proper value (step S43) and stops the supply operation when the supply amount has reached to the proper value (step S44). Whether the supply amount has reached to the proper value is determined by monitoring the output of the supply sensor FS. At the step when the count value of the supply sensor FS has reached to the proper value, the CPU 201 stops the operation of the motor MT4 and stops the supply operation.

The proper supply amount of pellets PT is not limited to the supply amount as illustrated in FIG. 14. The proper supply amount may always be a constant amount.

Returning to FIG. 12, the supply operation will be described.

In steps S26 and S27, it has been described that in case when the temperature T detected by the remaining amount detected sensor 606 inside the adhesive tank 601 is lower than the predetermined temperature Ta and Tb in the steps S26 and S27, the CPU 201 executes the first operation (step S28). However, due to the effects of the heater 605 inside the adhesive reservoir 601, there is a case that even though the remaining amount of adhesive inside the adhesive tank 601 is small, the temperature T detected by the remaining amount detection sensor 605 is higher than Ta or Tb. Thus, in case when the supply operation of pellets PT is conducted only based on the detected results of the remaining amount detection sensor 606 without any other countermeasure taken, even though the remaining amount is little, there is a case that pellets PT are not supplied from the supply section 61 and the formation of bookbinding is not appropriately conducted due to the deficit of remaining amount of adhesive.

Thus, whether pellets PT are supplied is to be determined based on the adhesive amount coated by the coating roller 602. The adhesive amount coated by the coating roller 602 corresponds to the thickness of the sheet bundle SS. In case when the integrated calculation value X of the sheet bundle SS is equal to or more than a predetermined value, it is determined that the adhesive inside the adhesive tank 601 has been consumed. Based on this concept, in the step S29, whether the integrated calculation value X of the sheet bundle SS is equal to or more than 70 mm is determined. Here, "70 mm" is one of the examples of the reference value, and it may be other value. The determination in the step S29 is conducted by the CPU 201 by referring to the integrated calculation value X of the sheet bundle SS stored in the RAM 203.

In case when the integrated calculation result X of the sheet bundle SS is less than 70 mm (step S29: No), the CPU determines that the adhesive inside the adhesive tank 601 has not been consumed so much and does not execute the supply operation of pellets PT. On the other hand, in case when the integrated calculation value X is equal to or more than 70 mm (step S29: Yes), irrespective of the detected results of the remaining amount detection sensor 606, the CPU 201 determines that the adhesive amount coated to the sheet bundle SS by the coating roller 602 is more than the predetermined amount and the adhesive inside the adhesive tank 601 has been consumed. Then the second supply operation will be executed (step S30).

The second supply operation is the same as the first supply operation. However, in the case of the second supply operation, pellets PT will be supplied until the count number of the supply sensor FS becomes to "15" based on the assumption that a lot of adhesive has been consumed.

Once the second supply operation has been conducted, the CPU 201 increase the number of execution times of the second supply operation by one (one time) in order to set a proper supply determination temperature (step S31). In case when the job has not been completed (step S32: No), the steps S21-S31 will be repeated.

The supply operation of pellets PT have been described by referring to FIG. 12. As described above, by supplying adhesive in case when the adhesive amount coated onto the sheet bundle SS (the integrated calculation value X of the thickness of the sheet bundle SS in FIG. 12) has reached to the predetermined value (70 mm in FIG. 12), as it has been conducted in the steps S29 and S30, the deficit of the remaining amount of adhesive can be prevented and it becomes possible to form an proper booklet. Further, by conducting operation for determining whether supplying adhesive by using the remaining amount detection sensor 606 for detecting the adhesive amount inside the adhesive tank 601, since the adhesive amount inside the adhesive tank 601 can be properly determined, the deficit of remaining amount of adhesive further securely prevented.

The present invention is not limited to the above embodiment and various changes and modification may be made without departing from the scope of the invention.

Since the adhesive amount coated onto the sheet bundle SS corresponds to the thickness of the sheet bundle SS, in this embodiment, the CPU is to determine whether the adhesive should be supplied by calculating the integrated calculation value X of sheet bundle SS. However, as long as it is a value corresponding to the adhesive amount coated to the sheet bundle SS, other value may be used for the determination. For example, whether the adhesive should be supplied is determined based on both values of the integrated calculation value X of sheet bundle SS and the longitudinal length of the spine of the sheet bundle SS. Since the longitudinal length of the spine of the sheet bundle SS is determined by the size of sheet S1, whether the adhesive should be supplied can also be determined based on the data of size of sheet S1, which as been set by a user in the operation section of the image forming apparatus A, and the integrated calculation value X of sheet bundle SS.

What is claimed is:

1. A bookbinding apparatus which forms a booklet by coating adhesive onto a spine of a sheet bundle, the bookbinding apparatus comprising:
   an adhesive tank which stores adhesive;
   a supplying section which supplies solid adhesive to the adhesive tank;
   a melting section which melts the solid adhesive supplied to the adhesive tank;
   a coating section which coats the adhesive onto the spine of the sheet bundle;
   a measuring section which measures a thickness of the sheet bundle; and
   a controller which determines that an amount of adhesive that has been coated by the coating section is greater than or equal to a predetermined value when an integrated value of the thickness of the sheet bundle that has been measured by the measuring section is greater than or equal to a predetermined quantity, and which controls the supplying section to supply the solid adhesive from the supplying section to the adhesive tank when the controller determines that the amount of adhesive that has been coated by the coating section is greater than or equal to the predetermined value.

2. A bookbinding system comprising:
   an image forming apparatus which forms an image onto a sheet; and
   the bookbinding apparatus of claim 1, which forms a booklet from a plurality of sheets outputted from the image forming apparatus.

* * * * *